Sept. 10, 1935.  N. S. YOST  2,013,821
ELECTRIC MOTOR
Filed Nov. 4, 1933  2 Sheets-Sheet 1
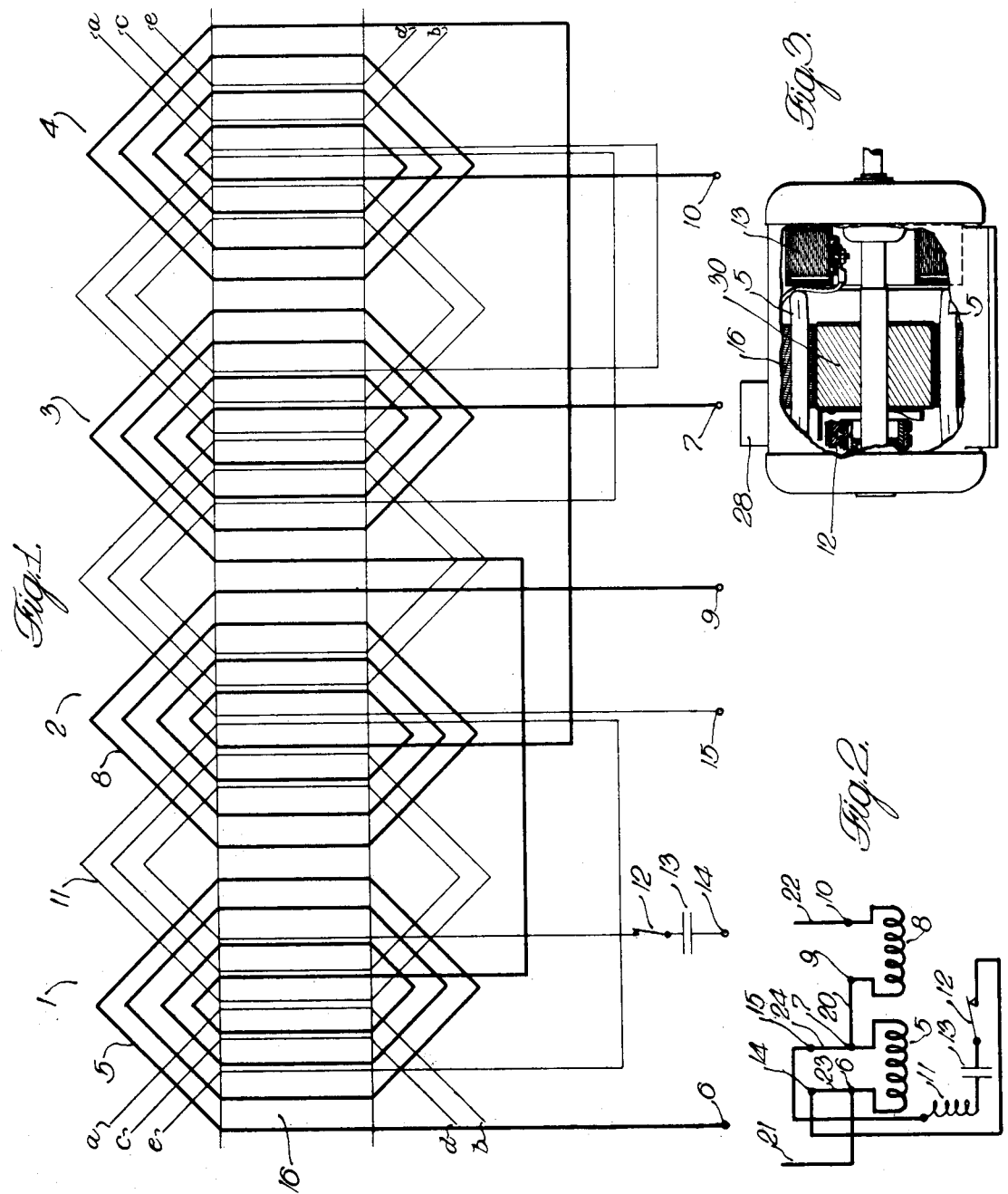
Inventor:
Norman S. Yost Sept. 10, 1935.  N. S. YOST  2,013,821
ELECTRIC MOTOR
Filed Nov. 4, 1933  2 Sheets-Sheet 2
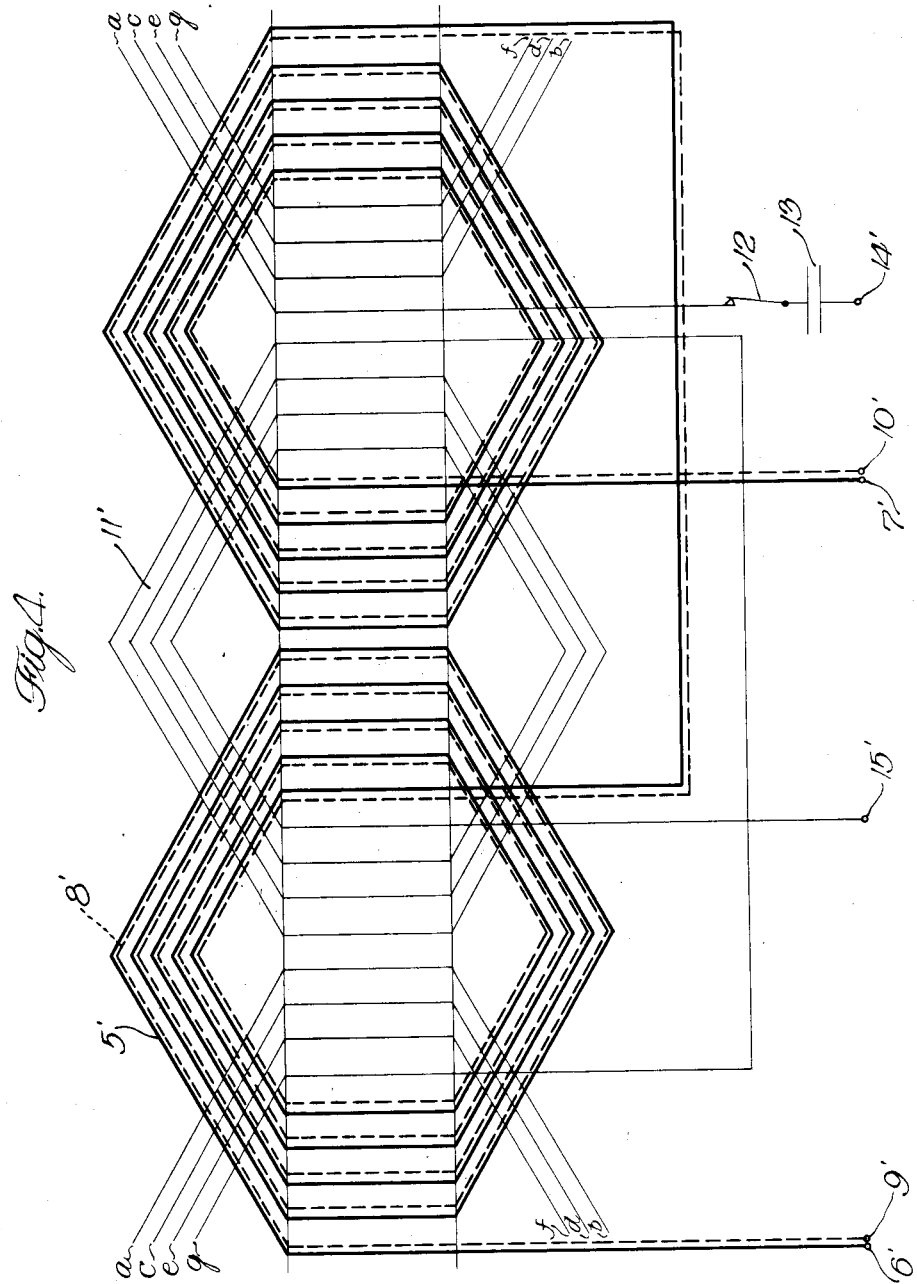

Patented Sept. 10, 1935

2,013,821

UNITED STATES PATENT OFFICE 2,013,821

ELECTRIC MOTOR

Norman S. Yost, Howell, Mich., assignor to Howell Electric Motors Company, Howell, Mich., a corporation of Michigan Application November 4, 1933, Serial No. 696,600

5 Claims. (Cl. 172—278)

This invention relates to alternating current electric motors.

In my Patent, No. 1,972,966, issued September 11, 1934, I show a single phase induction motor having a starting winding and a built-in condenser for furnishing the quadrature current necessary to provide the starting torque. The motor shown in that application is a single voltage motor. To use that motor on a higher voltage it is necessary to use a transformer in connection with the condenser, since a condenser constructed for, say, 110 volts cannot be used, satisfactorily, on, say, 220 volts. The transformer used does not lend itself to installation within the motor frame. If the transformer is mounted outside of the motor frame and the condenser within the frame, the external wiring becomes unduly complicated and otherwise objectionable. Also, the transformer makes the unit larger and more expensive.

It is one of the objects of the present invention to provide a single phase self starting induction type motor with built-in condenser and which may be used on two different voltages, say 110 volts and 220 volts, without requiring a transformer, external or internal, and without subjecting the condenser to excessive voltages when the motor is used on 220 volts. I accomplish this result by providing the stator with two operating windings that are similar, both electrically and magnetically, and providing an arrangement whereby the windings may be connected in parallel for operation at the lower operating voltage, or in series for operation at the higher operating voltage. The starting winding and the condenser are constructed for operation only at the lower voltage, and are connected through an automatically opened switch to one of the two operating windings. The voltage across the condenser is determined by the voltage across one operating winding, and this voltage is substantially the same whether the motor is used on 110 volts or 220 volts. The switch is arranged to open automatically when the motor reaches a certain speed, thereby cutting out the starting winding and the starting condenser.

By the above arrangement the starting circuit, including the starting winding, condenser and switch, remain at the lower voltage values, whether the motor is operated on 110 or 220 volts. This results in low and safe voltages, safe operation, and minimum insulation and winding costs.

All starting condensers, whether the motor is to be used primarily on 110 volts or 220 volts, are made for 110 volt operation, which is safer, simpler and cheaper than a condenser made for 220 volts.

The attainment of the above and further objects of the present invention will be apparent from the following specification taken in conjunction with the accompanying drawings forming a part thereof.

In the drawings:

Figure 1 is a circuit diagram illustrating a development of the stator windings of a machine constructed in accordance with my present invention;

Figure 2 is a circuit diagram of the connections of the motor of Figure 1;

Figure 3 is a fragmentary view, in partial section, illustrating a motor constructed in accordance with my invention; and Figure 4 is a view corresponding to Figure 1, showing a modified construction.

Reference may now be had more particularly to the motor shown in Figures 1, 2 and 3. Figure 1 illustrates the stator windings of a four pole induction motor. This includes two electrically separate operating windings, indicated by heavy lines, and one starting winding, indicated by faint lines. The four poles are indicated at 1, 2, 3 and 4. An operating winding 5, extending between the terminals 6 and 7, constitutes the means for energizing the poles 1 and 3. An operating winding 8, extending between the terminals 9 and 10, constitutes the means for energizing the poles 2 and 4. Where the motor constitutes more than four poles, the winding 5 is the winding of all the odd numbered poles, and the winding 8 is the winding for all the even numbered poles. It is to be noted that the winding 5 is arranged to energize the poles 1 and 3 in the same direction, so that the poles 1 and 3 are always at the same polarity. Likewise the winding 8 energizes its poles in the same direction, so that the poles 2 and 4 are always at the same polarity.

A starting winding is indicated at 11, said starting winding being connected through a switch 12 and a condenser 13 to terminals 14 and 15. Where a conductor of the starting winding 11 extends across the face of the armature core 16 adjacent a conductor of one of the windings 5 or 8, as shown in Figure 1, it indicates that those conductors are located in the same slot. Since Figure 1 is a developed view of the winding, it is understood that each of the conductor ends a—b—c—d—e on one side of the diagram is electrically continuous with the corresponding conductor ends at the opposite side of the diagram.

The switch 12 is normally closed, and is arranged to be opened automatically when the motor reaches a speed sufficient to permit continued operation thereof by the windings 5 and 8. The switch may be a centrifugal switch, or an electrical switch operated responsive to the existence of electrical conditions that prevail when the motor has reached a speed such that the starting winding may be disconnected.

In Figure 2 I have illustrated the connections between the terminals of the motor. In this figure, terminals 7 and 9 are connected together by a jumper 20, thus connecting the windings 5 and 8 in series between the power line conductors 21—22. This is the connection prevailing for the higher operating voltage, say, 220 volts. For operation at the lower operating voltage, say 110 volts, the two windings are connected in parallel. This is accomplished by removing the jumper 20 and connecting the terminals 6 and 9 together, and connecting the terminals 7 and 10 together. In Figure 2 I have shown the terminals 14 and 15 connected by suitable jumpers to the terminals 6 and 7, respectively. This places the winding 11, the switch 12 and the condenser 13 all in parallel with the operating winding 5. The voltage across the starting circuit is, therefore, never in excess of the voltage across the operating winding 5. If it is desired to reverse the direction of rotation of the motor it is merely necessary to reverse the connection of the jumpers 23—24 so that the terminal 14 is connected with the terminal 7 and the terminal 15 is connected with the terminal 6. In the event that the motor is designed for unidirectional operation the terminals 14 and 15 are omitted. The starting circuit is then connected across the operating winding 5 within the motor casing. The terminals 6, 7, 9 and 10, and, where provided, the terminals 14 and 15, are preferably located on a terminal board within a terminal box mounted on the motor casing. The relative polarity of the terminals 6 and 7 is always the same as the relative polarity of the terminals 9 and 10, regardless of whether a series or parallel connection is used. The magnetic polarity of the poles 2 and 4 will always be opposite to the polarity of the poles 1 and 3.

Reference may now be had to Figure 3, wherein I show, diagrammatically, the mechanical construction of my improved motor. The physical construction of the motor is such as shown in my patent, above referred to, to which reference may be had for a further description of the same. In this figure the stator core is indicated at 16, and one of the running windings at 5—5. The other running winding is displaced 90 mechanical degrees from the winding 5—5. The rotor, which may be of the squirrel cage type, is indicated at 30. The centrifugally opened switch 12 is located at one side of the motor casing, and the condenser 13 is located at the other side.

The condenser 13 is of an annular shape and is mounted within the motor casing in any preferred manner as, for instance, in the manner shown in my above referred to application. The condenser is an electrolytic condenser and is preferably contained in an aluminum container. A condenser suitable for this purpose is shown in my above referred to patent. The condenser per se does not constitute a part of the present invention and need not be described further. A terminal box assembly 28 is mounted at any convenient place on the motor frame. The terminals 6, 7, 9, 10, 14 and 15 are located within this box.

Reference may now be had to Figure 4, wherein I show a diagram corresponding to that of Figure 1, and illustrating a modified wiring arrangement. In Figure 4 the two operating windings are indicated at 5' and 8'. The two windings are electrically separate, but mechanically they constitute a single unit. The windings are formed by two separate wires in parallel, the two wires being wound as though they were one, in forming the coils. The winding 8' has been indicated in dotted lines merely for the purpose of illustration. The adjacent full and dotted lines of the coils 5' and 8' lie in the same slot. The number of turns of each of the two conductors comprising the windings 5' and 8' is made correct for, say, 110 volts. For 110 volt use the two coils are connected in parallel, while for 220 volt use the two coils are connected in series. The terminals of the coil 5' are indicated at 6' and 7', while the terminals of the coil 8' are indicated at 9' and 10', said terminals corresponding, respectively, to the similarly numbered terminals of the circuit shown in Figures 1 and 2. The starting winding is indicated at 11', and terminates at terminals 14' and 15', as in the case of the starting winding 11 of Figure 1.

The motor shown in Figure 4 is a two pole motor. It is, however, apparent that the method of forming the operating winding, as disclosed in this figure, is equally applicable to a four pole motor, or to a motor of any other number of poles. The winding of the two operating coils by laying the conductors side by side throughout their length produces a desirable electrical balancing effect, whereby the proper phase relationship of the currents in the respective poles is maintained.

In the motor of Figure 4, as in the motor of Figure 1, the lead of the starting coil 11' need not be brought out of the motor casing where the motor is intended for operation always in one direction. The starting winding 11' is electrically connected in parallel with one of the operating windings, as by the circuit shown in Figure 2.

In the motors of Figures 1 and 4 the two operating windings are each uniformly distributed throughout the stator. This prevents any unbalanced forces on the rotor in the event that the two operating windings are not axially identical.

In compliance with the requirements of the patent statutes I have herein shown and described a few preferred embodiments of my invention. It is, however, to be understood that the invention is not limited to the precise arrangements herein disclosed, the same being merely illustrative of the principles of the invention.

What I consider new and desire to secure by Letters Patent is:

1. A self starting single phase induction type motor adapted for operation at substantially the same speed and power at either of two operating voltages one of which is twice the value of the other, comprising an enclosed unit including a rotor, a stator comprising a set of poles, and a starting condenser, the starting condenser being designed for use with the motor at the lower of the two operating voltages, the stator including two operating windings comprising parallelly extending conductors of substantially similar characteristics and wound about said set of poles as a single strand, each of said windings being uniformly distributed throughout the stator to prevent unbalancing effects on the rotor, means for connecting the two windings in series for operation at the higher operating voltage and in parallel for operation at the lower operating voltage whereby the currents in and the voltages across the two operating windings are the same at either operating voltage, a starting winding connected in series with the condenser for creating proper starting conditions, said starting winding and condenser being energized at the same voltage during starting with the operating windings in series as with the operating windings in parallel, and switching means effective responsive to the attainment of a predetermined motor speed for disabling the condenser circuit.

2. A motor having a set of poles and having two windings extending side by side throughout their length and comprising two separately insulated conductors wound in parallel as a single strand about said poles, and means for connecting the two windings in series for one operating condition and in parallel for another operating condition.

3. A self starting single phase induction type motor having a set of poles and having two windings extending side by side throughout their length and comprising two insulated conductors wound as a single strand about said poles, means for connecting the two windings in series for one operating condition and in parallel for another operating condition, and a starting winding and a starting condenser, said starting winding and said condenser being connected in parallel with one of the first mentioned windings during starting under each of the two operating conditions.

4. A single phase alternating current motor having a plurality of poles, a pair of windings extending side by side and comprising two insulated conductors wound as a single strand about each of said poles, and means for connecting said two windings in series or in parallel.

5. A single phase alternating current motor having a plurality of poles, a pair of windings extending side by side and comprising two insulated conductors wound as a single strand about each of said poles, means for connecting said two windings in series or in parallel, and a starting winding connected in parallel with one of said windings.

NORMAN S. YOST.